US008360447B2

(12) United States Patent
Knoppers

(10) Patent No.: US 8,360,447 B2
(45) Date of Patent: Jan. 29, 2013

(54) AIRLINE CART

(75) Inventor: German Enrique Knoppers, Oude Leede (NL)

(73) Assignee: Aerocat B.V. (NL)

( * ) Notice: Subject to any disclaimer, the term of this patent is extended or adjusted under 35 U.S.C. 154(b) by 2 days.

(21) Appl. No.: 12/935,267

(22) PCT Filed: Mar. 27, 2009

(86) PCT No.: PCT/NL2009/000071
§ 371 (c)(1),
(2), (4) Date: Sep. 28, 2010

(87) PCT Pub. No.: WO2009/120067
PCT Pub. Date: Oct. 1, 2009

(65) Prior Publication Data
US 2011/0025006 A1     Feb. 3, 2011

(30) Foreign Application Priority Data

Mar. 28, 2008 (NL) .................................. 1035220

(51) Int. Cl.
*B62B 3/00* (2006.01)
(52) U.S. Cl. .................... 280/79.3; 280/47.34; 292/7
(58) Field of Classification Search ........... 280/47.34, 280/47.35, 79.11, 79.2, 79.3, 79.7; 292/7, 292/16, 32, 33, 35, 36, 40, 41, 42, 137, 158, 292/161, 162, 166, 168, 143, 145, 150; 312/215, 312/216, 217, 218, 219, 220, 221, 222, 325, 312/326, 327, 328, 329; 16/365, 366, 368, 16/369, 371, 387
See application file for complete search history.

(56) References Cited

U.S. PATENT DOCUMENTS

| | | | | | |
|---|---|---|---|---|---|
| 939,287 | A | * | 11/1909 | Miner | 217/8 |
| 1,438,547 | A | * | 12/1922 | O'Connor | 292/161 |
| 1,602,762 | A | * | 10/1926 | Furnas | 292/162 |
| 1,625,145 | A | * | 4/1927 | O'Connor | 292/188 |
| 1,771,041 | A | * | 7/1930 | Huebner | 16/230 |
| 1,970,267 | A | * | 8/1934 | Bales | 312/329 |
| 2,337,948 | A | * | 12/1943 | Vani | 16/237 |
| 2,946,640 | A | * | 7/1960 | Sitler | 312/332.1 |
| 2,967,080 | A | * | 1/1961 | Nelson | 312/216 |
| 3,216,483 | A | * | 11/1965 | Ford | 160/370.1 |
| 3,321,258 | A | * | 5/1967 | MacKay | 312/287 |
| 3,726,535 | A | * | 4/1973 | Longato | 280/659 |
| 3,909,091 | A | * | 9/1975 | Tantillo | 312/224 |
| 3,933,383 | A | * | 1/1976 | Walker | 292/262 |
| 3,977,689 | A | * | 8/1976 | Rosa | 280/33.996 |
| 4,098,424 | A | * | 7/1978 | Liebscher et al. | 220/4.29 |
| 4,263,853 | A | * | 4/1981 | Robertson | 105/378 |
| 4,576,425 | A | * | 3/1986 | Pinnow et al. | 312/324 |
| 4,614,374 | A | * | 9/1986 | Lannert et al. | 292/337 |
| 4,770,476 | A | * | 9/1988 | Lakso | 312/220 |
| D305,822 | S | * | 1/1990 | Kolvites et al. | D34/19 |

(Continued)

*Primary Examiner* — Katy M Ebner
*Assistant Examiner* — Brodie Follman
(74) *Attorney, Agent, or Firm* — Ryan A. Schneider, Esq.; Troutman Sanders LLP

(57) ABSTRACT

A cart for distributing for instance food in aisles of airplanes is described. The cart comprises a cabinet-shaped body (10) as well as a door (20) coupled hingedly to the body, capable of being closed by means of a lock system (100). The lock system is a multipoint lock system (100), wherein a bolting of the door with respect to the body is accomplished at a plurality of positions along a free vertical side edge (23) of the door.

25 Claims, 16 Drawing Sheets

U.S. PATENT DOCUMENTS

| | | | | |
|---|---|---|---|---|
| 4,936,377 A * | 6/1990 | DeVogel et al. | | 165/47 |
| 5,000,494 A * | 3/1991 | Guibleo | | 292/148 |
| 5,056,194 A * | 10/1991 | Huber | | 16/366 |
| RE34,171 E * | 2/1993 | Romick et al. | | 312/257.1 |
| 5,205,628 A * | 4/1993 | Swets et al. | | 312/216 |
| 5,235,833 A * | 8/1993 | Pinto | | 70/471 |
| 5,314,244 A * | 5/1994 | Swets et al. | | 312/330.1 |
| 5,427,445 A * | 6/1995 | Mitchell | | 312/221 |
| 5,475,897 A * | 12/1995 | Satoh et al. | | 16/291 |
| 5,503,440 A * | 4/1996 | Peccoux | | 292/158 |
| 5,605,344 A * | 2/1997 | Insalaco et al. | | 280/47.34 |
| 6,139,034 A * | 10/2000 | Williams | | 280/47.35 |
| 6,234,498 B1* | 5/2001 | Saku et al. | | 280/47.34 |
| 6,357,806 B1* | 3/2002 | Saku | | 292/182 |
| 6,564,428 B2 * | 5/2003 | Richard et al. | | 16/366 |
| 6,739,093 B1* | 5/2004 | Holbert | | 49/394 |
| 6,907,830 B2* | 6/2005 | Guinan et al. | | 109/24.1 |
| 6,935,661 B1* | 8/2005 | Farnsworth et al. | | 292/162 |
| 6,971,322 B2* | 12/2005 | DuBois et al. | | 109/24.1 |
| 7,055,833 B2* | 6/2006 | Wixted et al. | | 280/47.34 |
| 7,370,867 B2* | 5/2008 | Olson et al. | | 280/79.11 |
| 7,370,890 B2* | 5/2008 | Samsel | | 292/42 |
| 7,444,830 B2* | 11/2008 | Moran et al. | | 62/371 |
| 7,458,441 B2* | 12/2008 | Hu | | 186/45 |
| 7,461,849 B2 * | 12/2008 | Robbins et al. | | 280/47.35 |
| 7,494,012 B1* | 2/2009 | Priebe et al. | | 206/538 |
| 7,510,249 B2 * | 3/2009 | Fromme et al. | | 312/217 |
| 7,544,915 B2* | 6/2009 | Hu | | 219/387 |
| 7,775,564 B2* | 8/2010 | Moore | | 292/37 |
| 7,856,696 B2* | 12/2010 | Huck | | 16/366 |
| 7,909,419 B2* | 3/2011 | Vinke | | 312/215 |
| 7,942,430 B2* | 5/2011 | Van Loon et al. | | 280/47.34 |
| 7,963,533 B2* | 6/2011 | Bothun et al. | | 280/47.35 |
| 2003/0001465 A1* | 1/2003 | Carter et al. | | 312/215 |
| 2003/0141687 A1* | 7/2003 | Wixted et al. | | 280/47.35 |
| 2005/0218615 A1* | 10/2005 | Hu | | 280/47.35 |
| 2005/0285360 A1* | 12/2005 | Helin et al. | | 280/47.34 |
| 2006/0070814 A1* | 4/2006 | Hu | | 186/45 |
| 2006/0108757 A1* | 5/2006 | Brookmire et al. | | 280/47.34 |
| 2008/0150300 A1* | 6/2008 | Harger et al. | | 292/32 |
| 2008/0276840 A1* | 11/2008 | Van Loon et al. | | 108/33 |
| 2008/0278043 A1* | 11/2008 | Holcomb | | 312/219 |
| 2010/0140890 A1* | 6/2010 | Boivin et al. | | 280/47.34 |
| 2011/0012371 A1* | 1/2011 | Hamblin | | 292/36 |
| 2011/0018285 A1* | 1/2011 | Mitchell et al. | | 292/161 |
| 2011/0025006 A1* | 2/2011 | Knoppers | | 280/47.34 |
| 2011/0116239 A1* | 5/2011 | Chen et al. | | 361/726 |
| 2011/0278879 A1* | 11/2011 | Belanger et al. | | 296/187.01 |

* cited by examiner

AIRLINE CART

BENEFIT CLAIMS

This application is a US National Stage of International Application No. PCT/NL2009/000071, filed 27 Mar. 2009, which claims the benefit of NL 1035220, filed 28 Mar. 2008.

FIELD OF THE INVENTION

The invention relates in general to a catering trolley or serving trolley (cart) for use in airplanes.

BACKGROUND OF THE INVENTION

Such catering trolleys or carts are generally known. They comprise a cabinet-shaped body, at least one door, an upper panel, wheels, etc. The trolleys are used for presenting for instance meals and drinks, or other articles, to airplane passengers, the trolleys riding through the aisle of the airplane, pushed or pulled by the serving cabin personnel.

Some important requirements are set to such carts. A first requirement concerns safety and strength. The carts must be able to withstand heavy loads, and must meet severe fire-safety requirements. In order to meet these requirements, carts are traditionally made of aluminum, in which case for instance wall panels are fixed to a frame. Hinges for a door, and a latch mechanism for the door, are also attached to this frame. However, this has some disadvantages. Because the aluminum carts consist of multiple aluminum parts, manufacturing and assembling is relatively expensive. Further, aluminum is susceptible to damages such as dents and cracks, and is therefore relatively expensive in maintenance. Furthermore, an important disadvantage is that aluminum carts are relatively heavy, while especially in the world of airplanes there exists a desire for as much weight reduction as possible.

BRIEF SUMMARY OF THE INVENTION

The present invention aims in general to solve or at least reduce the said disadvantages.

More particularly, the present invention aims to provide a cart with a relatively low weight, of which the costs of manufacturing and maintenance are relatively low, while nevertheless the requirements of safety and strength are met.

In order to reduce the weight of the cart, the present invention proposes to manufacture the cart from plastic as much as possible. In a previous patent application, the same inventor has already proposed to manufacture the cabinet body as a self-supporting extrusion part from plastic. In this earlier patent application, the design of the door is described summarily only. In contrast, the present invention relates to the design of the door. According to an important aspect of the present invention, it is proposed to manufacture the door from plastic for at least a large part.

An evidently important characteristic of a door is that it can not only be easily opened and closed, but also that it remains closed in the closed condition under extreme circumstances. Particularly, strength requirements are set to a door in conjunction with unexpected shock movements, coming to expression in a punch-shaped load from the inside. The construction of the door must therefore be capable to withstand large outward forces without opening.

In the case of aluminum doors according to the state of the art, it is fairly easy to meet these demands because aluminum is a strong material. In the case of plastic doors this is much more difficult because plastic deforms easier and fails earlier at a certain load. Therefore, it is not simply possible to implement in plastic the design of an aluminum door.

The most vulnerable points are the hinges and the lock. An aluminum door according to the state of the art is typically provided with two hinge points at one side and a three point lock at the opposite side. In an attempt to solve the said problem, it has already been proposed, instead of one single door over the entire width of the cart, to use two half doors, each over the half width of the cart, wherein each door is then provided with two hinge points and wherein the free sides of the doors are locked to each other. The idea behind this is undoubtedly that the forces are then distributed over two doors so each door is loaded less, but, whether or not this is actually effective, the users find such design uncomfortable and desire a single door over the entire width of the cart.

According to a first aspect of the present invention, the strength of a door is increased by providing the door with a large number of hinge points above each other. According to a second aspect of the present invention, the strength of a door is increased by providing the door with a large number of locking points above each other. Thus, the forces acting on the door are distributed over multiple hinge points and locking points and the material of the door is loaded less per hinge point and per locking point, respectively.

GB-2.024.735 describes a cart with a hinging door 11, attached to one side wall by means of hinges 12, which can be connected to the other side wall by means of two individual bolts 13. Such solution only holds the door at two places. Further, such solution does not form a real multipoint lock, which can be locked and unlocked by one single action, but in contrast it forms a plurality of individual one point locks, which must be individually locked and unlocked by a plurality of individual actions.

According to the present invention, a cart herefore distinguishes itself with aspects to the cart from GB-2.024.735 by the features mentioned in the characterizing part of claim 1.

BRIEF DESCRIPTION OF THE DRAWINGS

These and other aspects, features and advantages of the present invention will be further clarified by the following description with reference to the drawings, in which same reference numerals indicate same or similar parts, in which indications "lower/upper", "higher/lower", "left/right" etcetera only relate to the orientation shown in the figures, and in which.

Figure 10A:
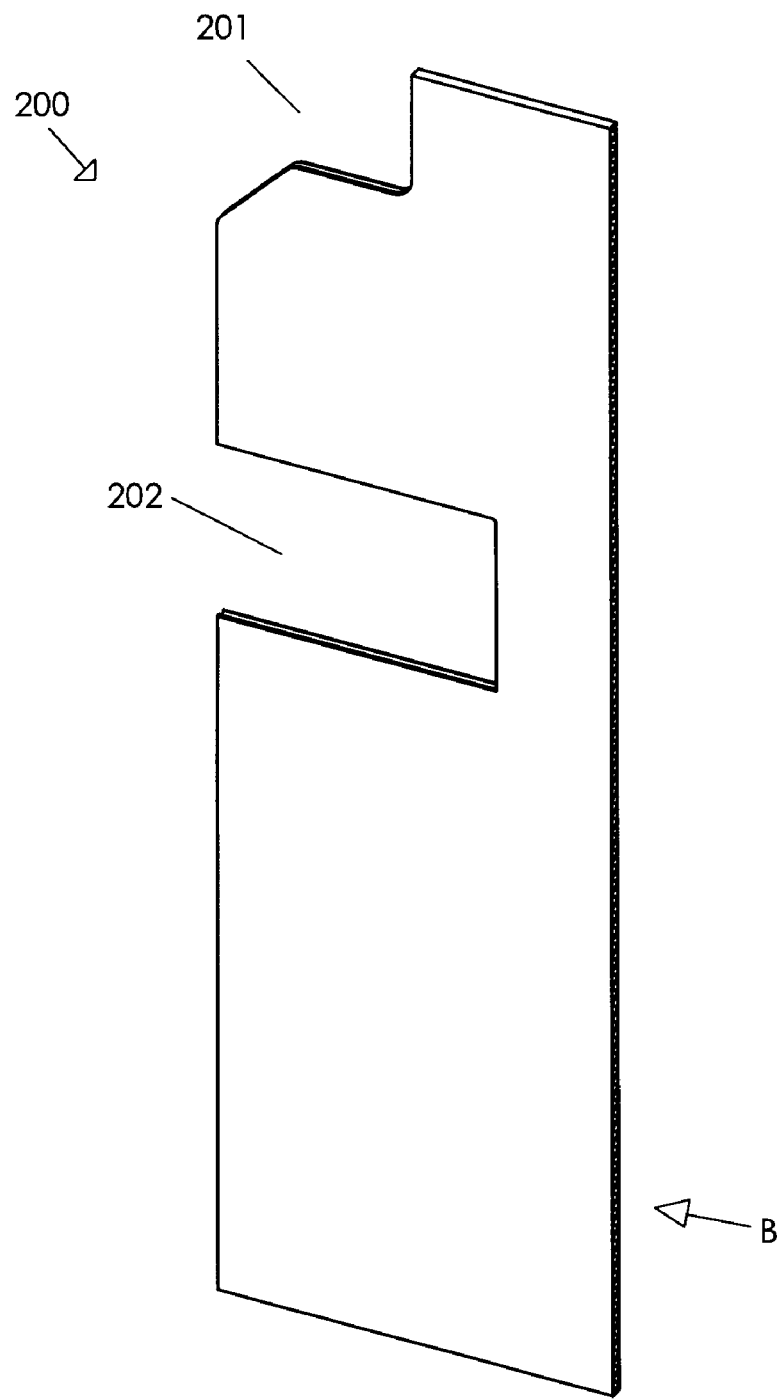
Figure 10B:
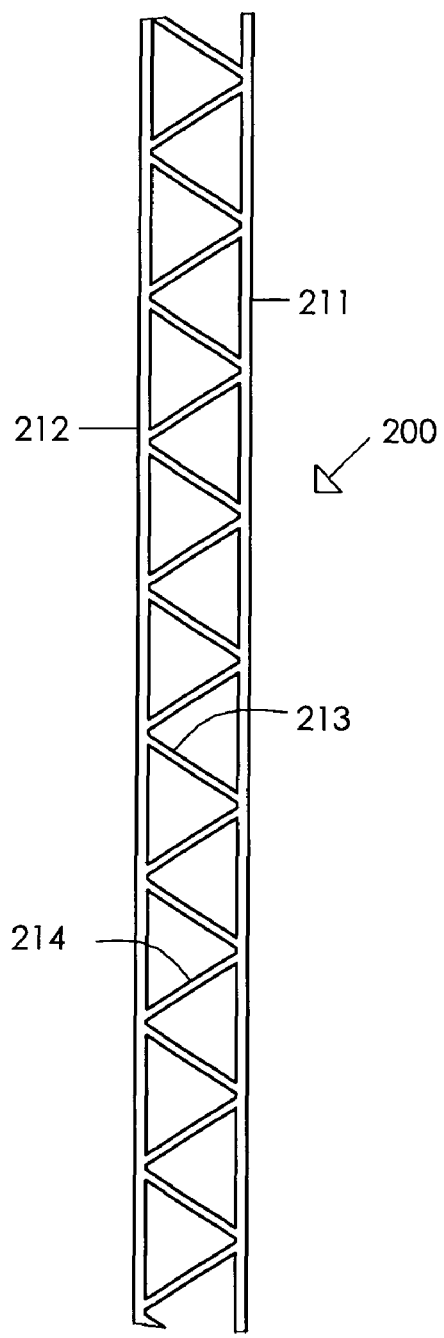

and the FIGS. 10A and 10B illustrate an extrusion plate of the door.

DETAILED DESCRIPTION OF PREFERRED EMBODIMENTS

Figure 1A:
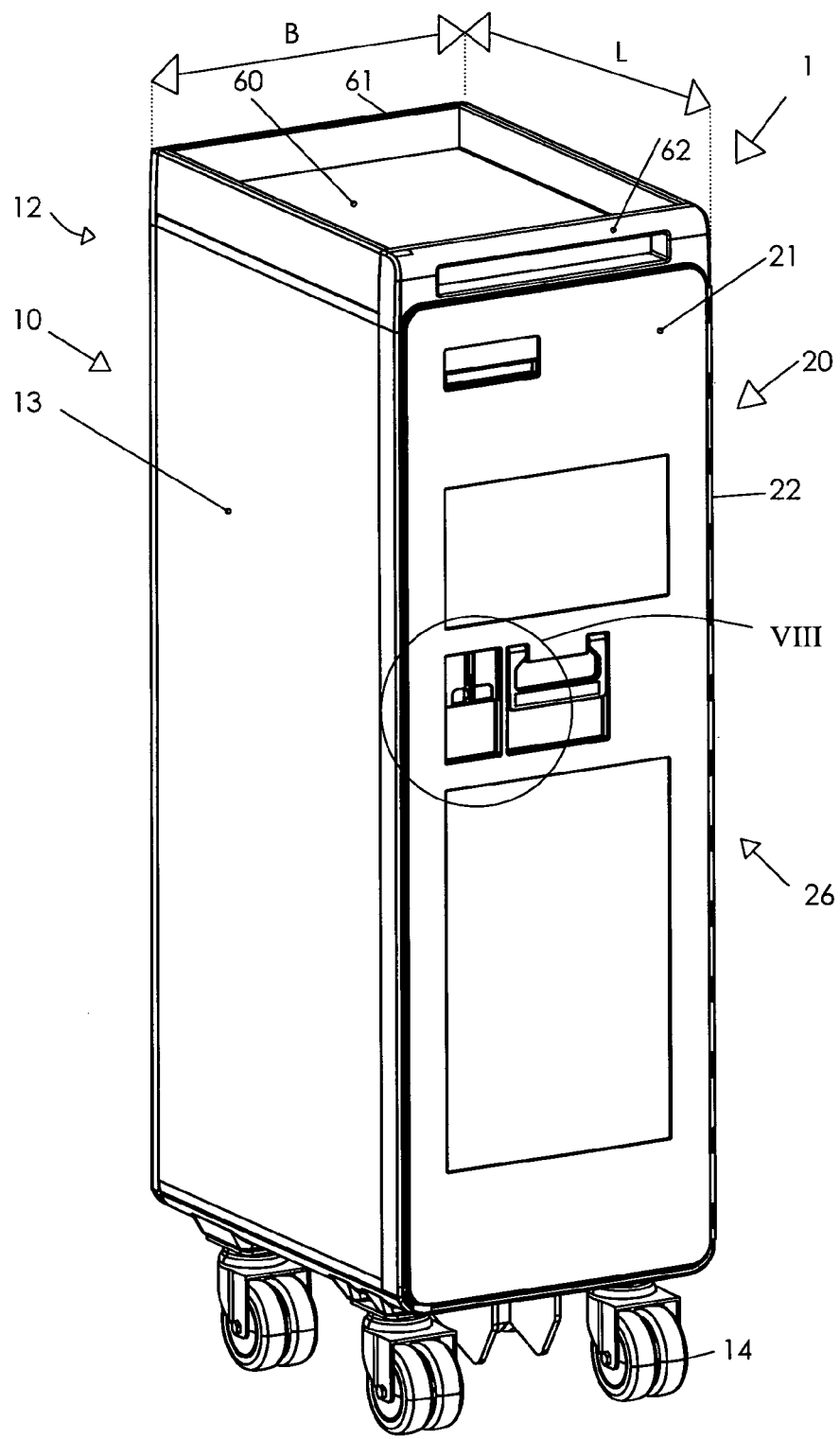
FIGS. 1A-1C show schematic perspective views of a cart according to the present invention.
Figure 1B:
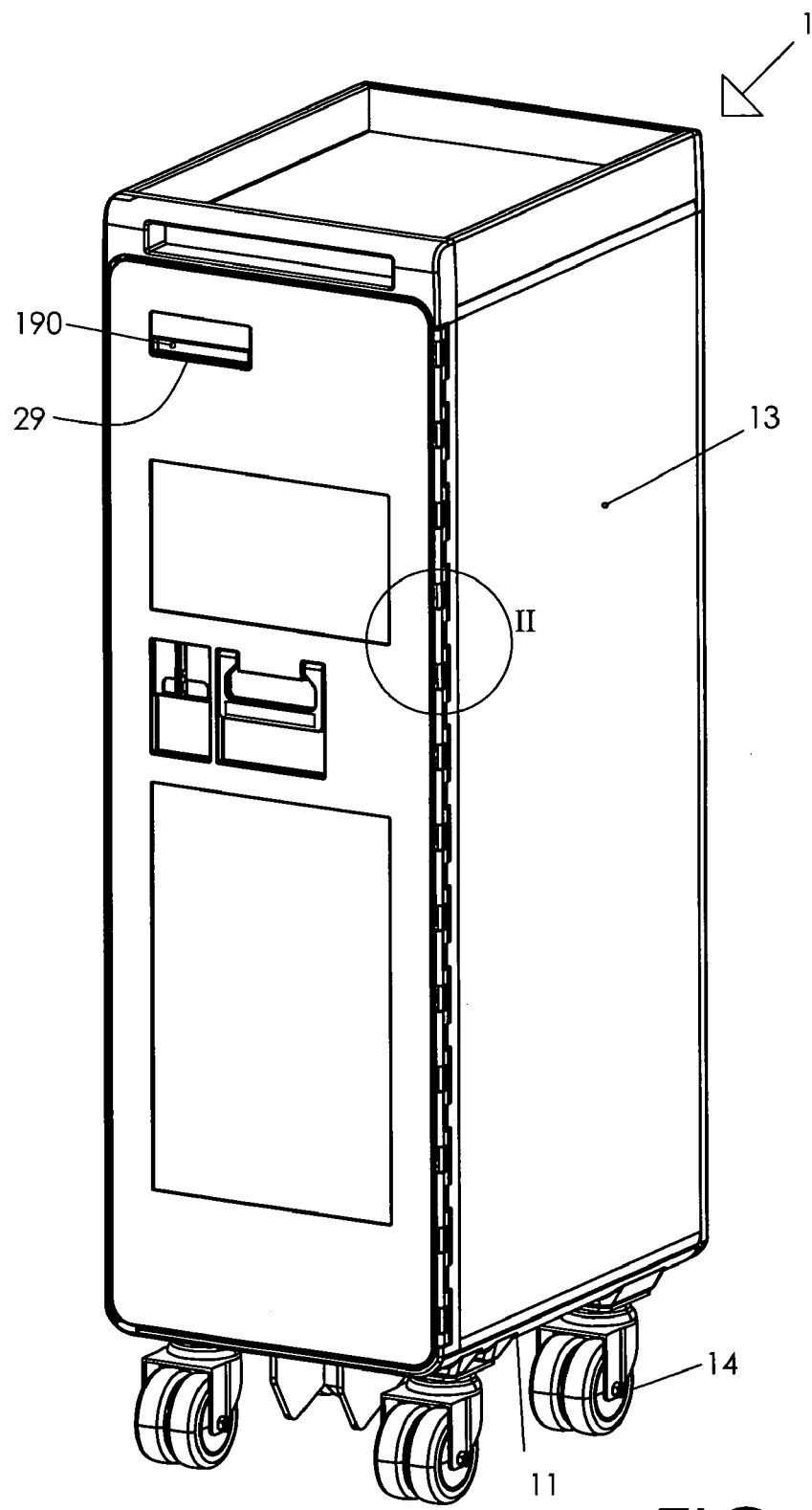

FIGS. 1A and 1B show perspective views of a cart according to the present invention, generally indicated by reference numeral 1. The cart 1 is suitable for use in aisles of airplanes, although other applications are also conceivable, for instance in aisles of trains or buses. Thus, the cart has a relatively small width B that is sufficiently smaller than the aisle width concerned. The height of the cart is typically in the order of about 1 m. The length of the cart is indicated by L.

Figure 1C:
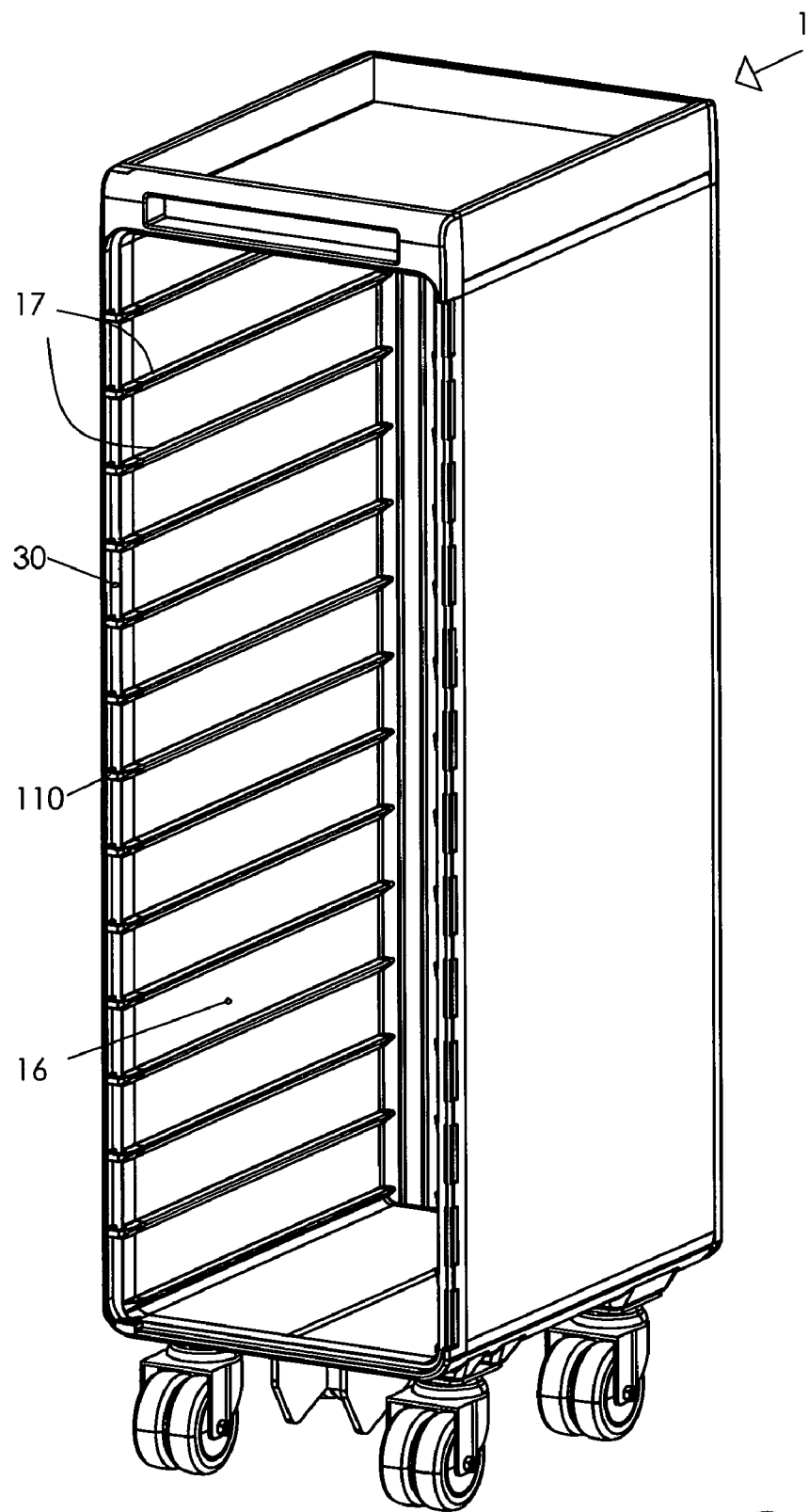

The cart has a cabinet-shaped body 10, with a bottom 11, an upper wall 12 with thereon a dish 60 with an upstanding edge 61 and a handle 62, and side walls 13, enclosing an inner space 16. Wheels 14 are mounted below the bottom 11. At its front side, the cart has a door 20. Although a door may also be present at the rear side (not visible in FIGS. 1A-1B), a fixedly closed rear wall may also be present here. FIG. 1C is a view comparable to FIG. 1B, with the door 20 being left away. It can be seen in this figure that the cabinet-shaped body 10 at its front is provided with a door frame 30 for mounting thereto the door 20. The door frame 30 may be a solid plastic form piece, or possibly a metal form piece such as an aluminum form piece.

Figure 2:
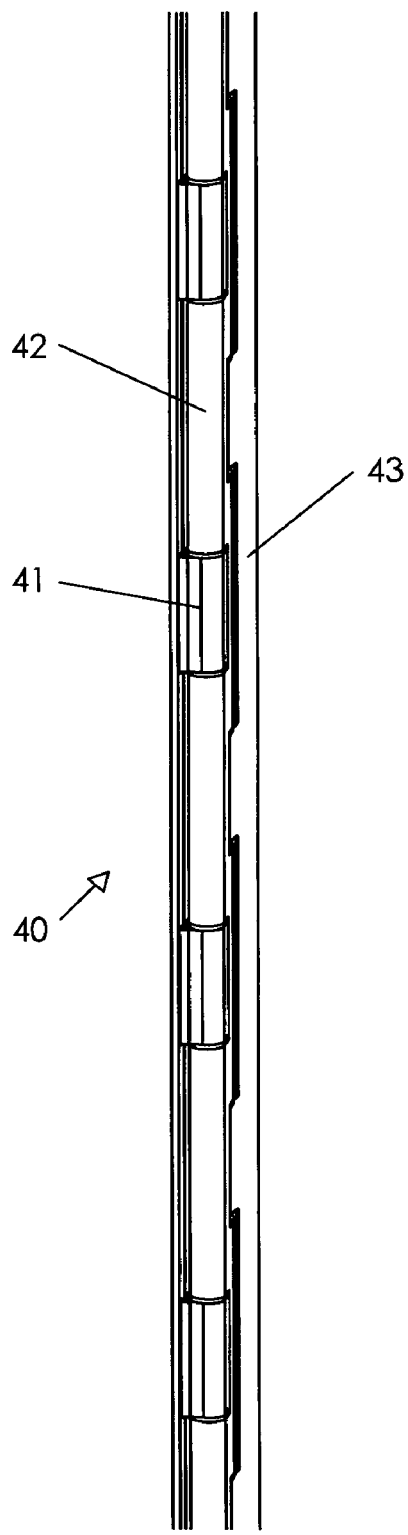
FIG. 2 illustrates a hinge design on a larger scale.
Figure 3:
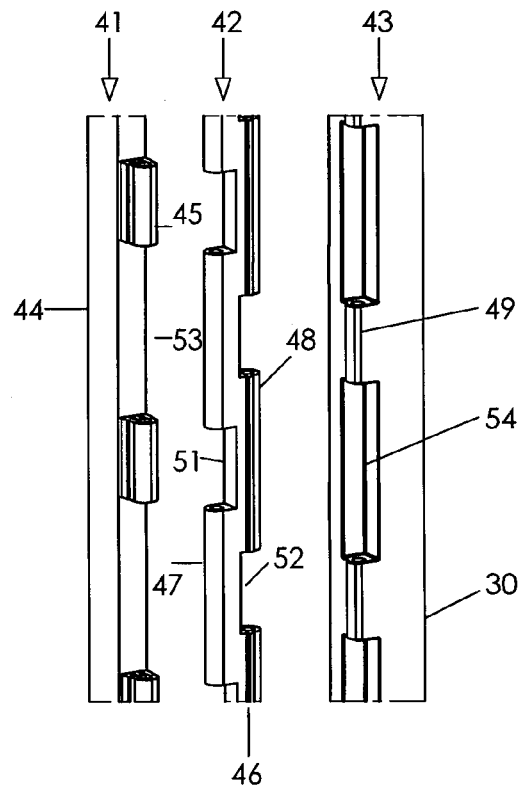
FIG. 3 shows a double action hinge in taken apart condition.
Figure 4:
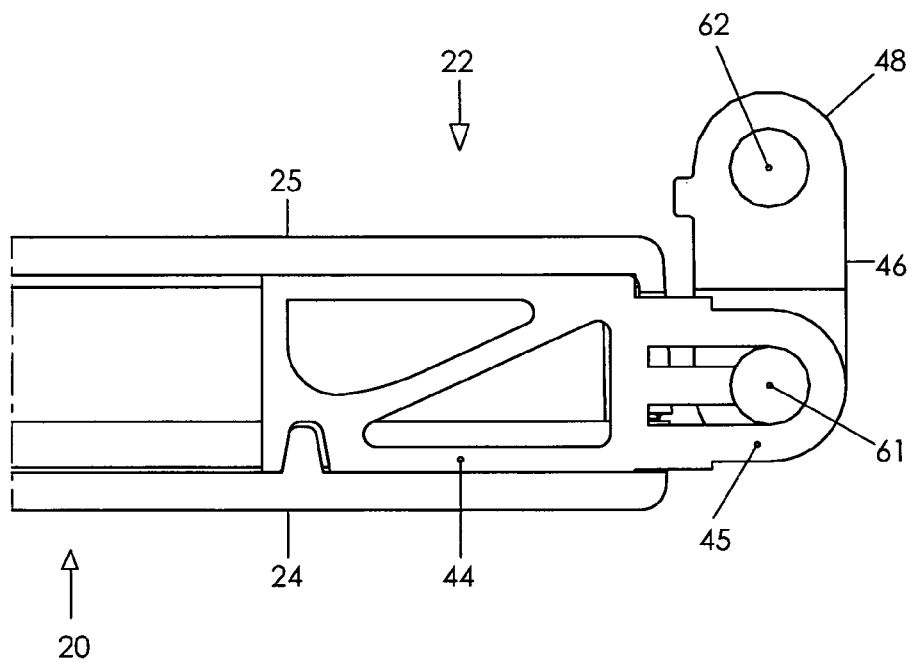
FIG. 4 shows a cross section of an edge part of a door.

According to the earlier proposal of the same inventor, the cabinet-shaped body 10 is formed as an extrusion part from plastic, preferably PEI or PPSU, but the present invention is not limited to application of these materials. According to the present inventive concept, the door 20 comprises a plastic door body 21 with two vertical side edges 22, 23. Along the entire length of one of the vertical side edges, the righthand side edge 22 in the embodiment shown, the door 20 is provided with a double action multipoint piano hinge 40 with which the door 20 is attached to the frame 30. FIG. 2 shows an enlargement of part II of FIG. 1B, in which this double action piano hinge 40 can be seen more clearly. FIG. 3 shows, the double action piano hinge 40 in taken apart condition. FIG. 4 shows a cross section of the edge part 22 of the door 20.

The piano hinge 40 comprises a first hinge part 41, an intermediate hinge part 42, and a third hinge part 43. The first hinge part 41 comprises an elongate strip 44 that at one longitudinal side is provided with a series of mutually aligned eyes 45 above each other. In the example shown, the number of eyes 45 is equal to 13, but this number may be higher or lower. The elongate strip 44 is attached to the door body 21. At least along its side edge 22, the door body 21 has a thickness larger than the thickness of the elongate strip 44, and is provided with a recess in which the elongate strip 44 fits. In a practical embodiment, the door body 21 comprises two shell parts 24 and 25 attached to each other or to a carrier body (not shown), wherein the elongate strip 44 is accommodated between the edge parts of these shell parts 24 and 25, as shown in FIG. 4. The first hinge part 41 may be manufactured from plastic, but may also be manufactured from metal such as aluminum. Alternatively, the first hinge part 41 may be formed as integral part of the door body 21, in which case the elongate strip 44 may be omitted.

The intermediate hinge part 42 comprises an elongate strip 46 that at one longitudinal side is provided with a first series of mutually aligned eyes 47 above each other and at its opposite longitudinal side is provided with a second series of mutually aligned eyes 48 above each other. The first eyes 47 and the second eyes 48 are displaced with respect to each other, so that the second eyes 48 are aligned with first interspaces 51 between the first eyes 47 while the first eyes 47 are aligned with second interspaces 52 between the second eyes 48. The first eyes 47 have a length equal to the interspaces 53 between the eyes 45 of the first hinge part 44, while the eyes 45 of the first hinge part 44 have a length equal to the first interspaces 51 between the first eyes 47. A first hinge pin 61 couples the first hinge part 41 with the intermediate hinge part 42. It can be seen in FIG. 1B that the intermediate hinge part 42 has a lowermost first eye 47 below the lowermost eye 45 of the first hinge part 41, and an uppermost first eye 47 above the uppermost eye 45 of the first hinge part 41, so that the number of first eyes 47 is equal to 14 while the number of second eyes 48 is equal to 13.

The third hinge part 43 comprises a series of mutually aligned eyes 49 attached above each other at the front side of the door frame 30, with mutual interspaces 54. The third hinge part 43 may comprise a separate strip carrying the eyes and attached to the frame, but preferably and as shown the eyes 49 are formed integrally with the frame 30. The eyes 49 have a length equal to the second interspaces 52 between the second eyes 48 of the intermediate hinge part 42, while the second eyes 48 of the intermediate hinge part 42 have a length equal to the interspaces 54 between the eyes 49 of the second hinge part 43. A second hinge pin 62 (FIG. 4) couples the third hinge part 43 with the intermediate hinge part 42. The third hinge part 43 comprises an uppermost eye above the uppermost second eye 48 of the intermediate hinge part 42 and comprises a lowermost eye below the lowermost second eye 48 of the intermediate hinge part 42, so that the number of eyes 49 is equal to 14. The second hinge pin 62 is longer than the intermediate hinge part 42, and extends into the uppermost and lowermost eyes of the third hinge part 43.

Figure 5A:
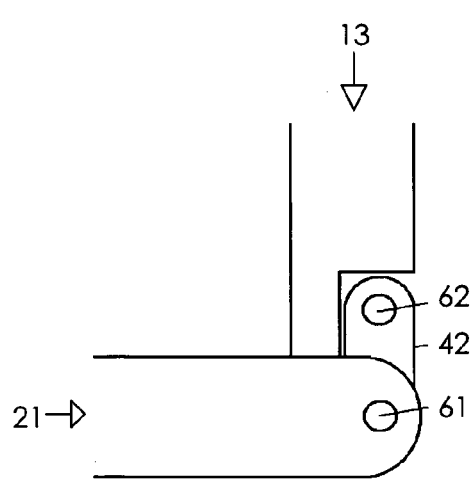
FIGS. 5A and 5B illustrate the hinge positions of the door in closed and opened condition.
Figure 5B:
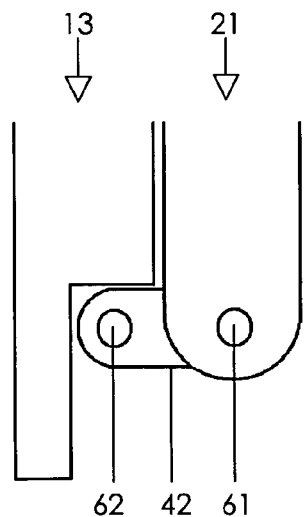

With this design, it is achieved that the door body 21 together with the first hinge part 41 is capable of hinging with respect to the second hinge part 42 around the first hinge pin 61, and together with the second hinge part 42 is capable of hinging with respect to the door frame 30 around the second hinge pin 62. If the door is closed, the hinge assembly does not extend beyond the side face 13 of the cart, as schematically illustrated in FIG. 5A. The door 20 may be opened over 270.degree. in order to lie against the side, face 13 of the cart, as schematically illustrated in FIG. 5B; in this situation, the door does not form any hindrance for placing trays or plates into the cart or removing them from the cart. Furthermore, an important aspect of this construction is that the door 20 is coupled to the cart body over its entire height so that the door remains well closed even in the case of large forces directed from inside to outside.

The cart 1 is further provided with a multipoint lock system 100 with which the free vertical side edge of the door body 21 opposite the hinge 40, thus the left side edge 23 in the embodiment shown, can be connected to the cart body, more particularly to the frame 30. It can be seen in FIG. 10 that the multipoint lock system 100 comprises a series of lock eyes 110 above each other, fixed with respect to the frame 30. These lock eyes 110 may be fixed to the frame 30 separately or by means of a common carrier, but preferably and as shown, the lock eyes 110 are formed integrally with the frame 30.

Figure 6A:
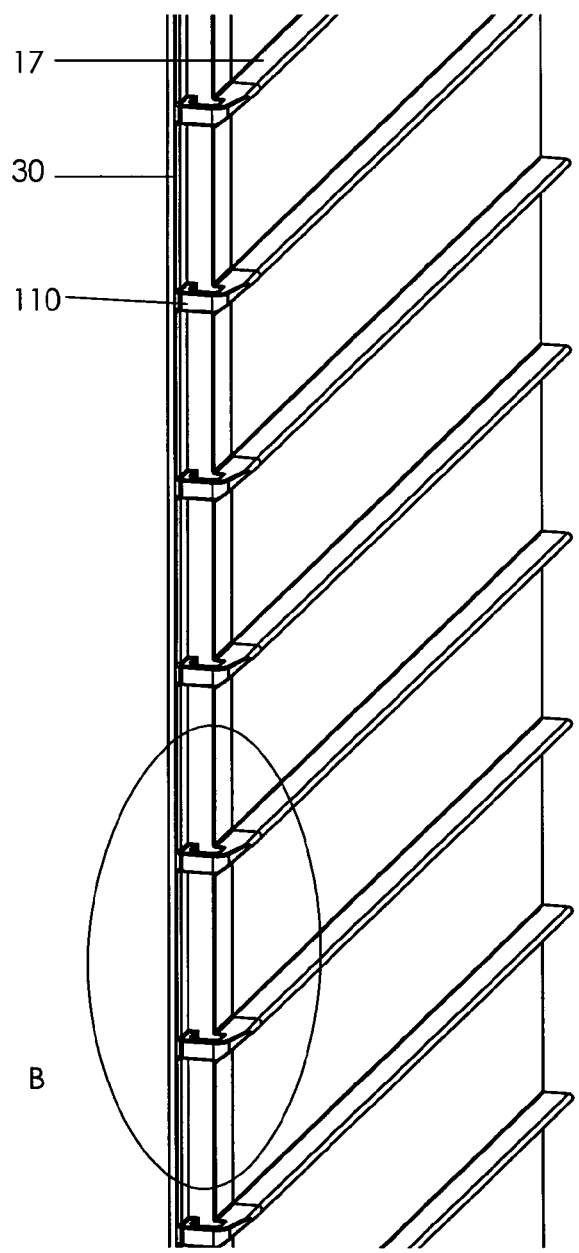
FIGS. 6A, 6B and 6D show details of a door frame with lock eyes formed thereto.
Figure 6B:
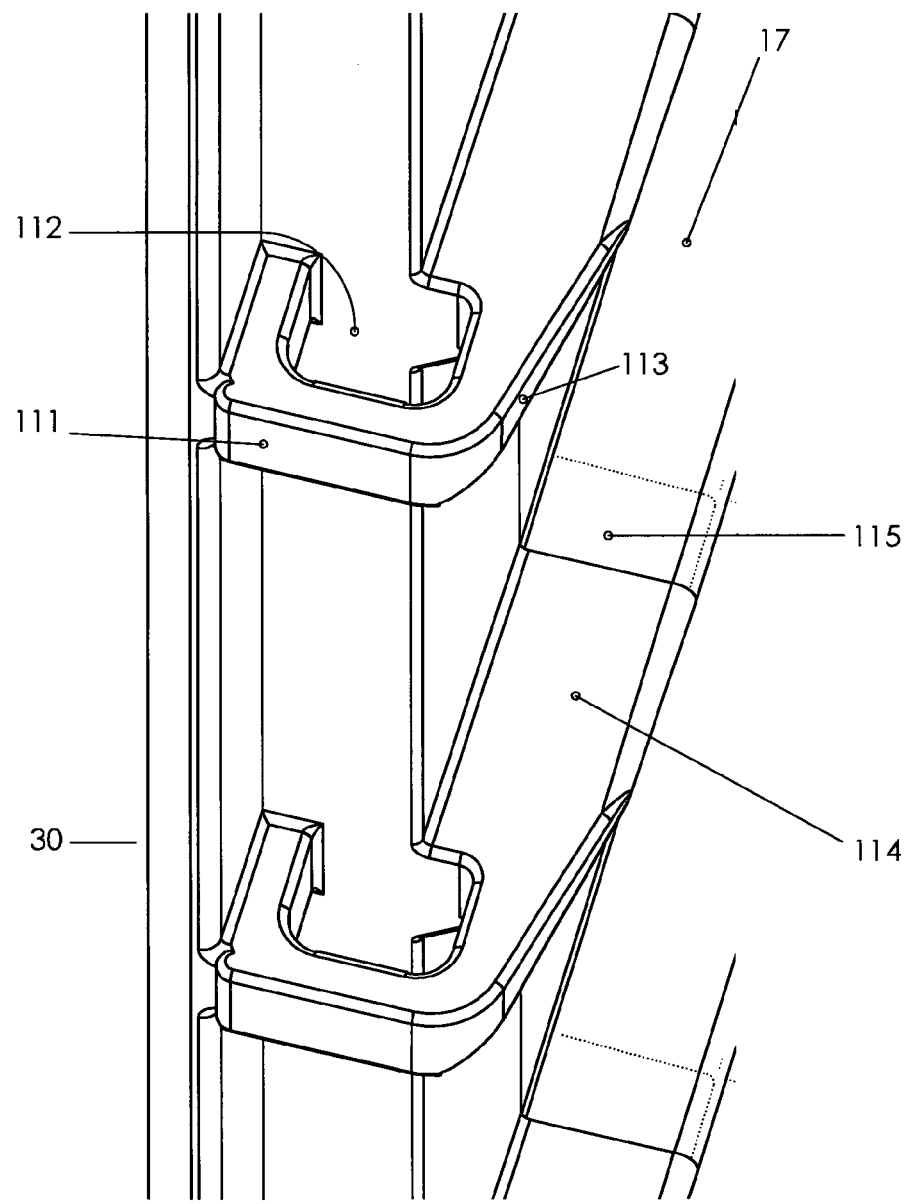
Figure 6C:
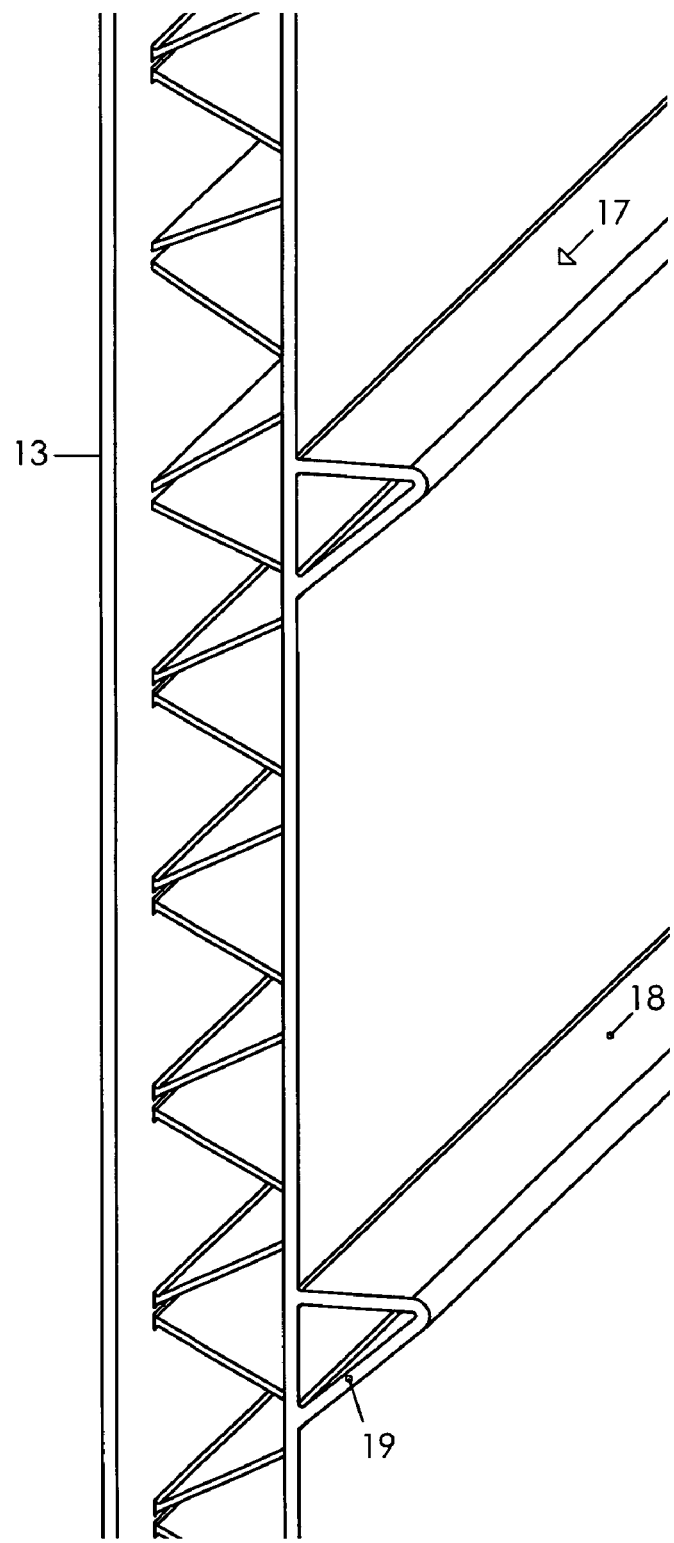
FIG. 6C shows the front edge of a cabinet body with door frame removed.

FIG. 6A is a perspective view of the cart, showing the frame 30 with the lock eyes 110 in a larger scale. FIG. 6B is a partial enlargement of part B in FIG. 6A, and FIG. 6C is a partial enlargement of the part B in which the frame 30 is omitted.

Eventually, the intention is that the cart can accommodate multiple removable plates in its interior, having thereon for instance meals to be distributed. To this end, each side wall 13 of the body 10 is, on its inner surface directed to the interior 16, provided with a number of horizontal guide rails 17, projecting towards the interior 16, on which the edges of such plates can rest. These guide rails 17 are visible in FIG. 10. In the embodiment shown, the number of guide rails 17 is equal to 13.

In the case of aluminum carts, these guide rails are fixed to the inner wall as separate parts. A disadvantage of this is again the weight, as well as the need of additional mounting actions.

It further is a disadvantage that it is fairly difficult to clean the unavoidable seams and cracks in a hygienic manner.

In a preferred embodiment, the cart 1 according to the present invention does not have these disadvantages because at least the side wall 13 is formed as an extrusion part and because the guide rails 17 have been formed together therewith as an integral part of the side wall 13 during the extrusion process. This is clearly visible in FIG. 1C. Thus, seams and cracks can be entirely avoided, which increases the hygiene of the cart and reduces the costs for cleaning. For reducing the weight, it is preferred that the guide rails 17 are hollow, as also shown. In the preferred embodiment shown, each guide rail 17 has a triangular contour with horizontal carrier face 18 and an oblique support 19.

It is in principle possible that the lock eyes 110 are located at an arbitrary height. However, it is desirable that the lock eyes 110 remain within the profile of the side wall 13. If the lock eyes 110 would project beyond the side wall 13 at the outer side of the cart, they are very vulnerable, they can damage or cause injuries, and they increase the effective width of the cart in a storage recess. If the lock eyes 110 would project beyond the side wall 13 in the inner space 16, they hinder the plates being slid in and out and the objects standing on the plates may hook behind the lock eyes 110.

In the case of positioning at a arbitrary height, the lock eyes 110 can remain within the profile of the side wall 13 only if the horizontal size of the lock eyes 110 is smaller than the thickness of the side wall 13, as measured between the planar outer wall and the planar inner wall parts between the guide rails 17. Such limitation of the horizontal dimensions, however, puts limitations on the strength of the lock eyes.

In order to reduce these disadvantages, according to the present invention the lock eyes 110 are preferably, and as clearly visible in FIGS. 6A and 6B, aligned with respective guide rails 17. Then, each lock eye 110 has the shape of a substantially horizontal strip 111 with a vertical hole 112, wherein the outer contour of this strip 111, in front view, corresponds to (at least does not project outside) the outer contour of the guide rail 17. At the front, the strip 111 may be rounded and may be provided with an oblique run in face 113. The upper surface 114 of the strip 111 lies at the same height as the upper surface 118 of the guide rail 17. In order to increase the robustness and form retainability, the strip 111 may at its rear side be provided with an extension piece 115 fitting in the hollow rail 17.

Figure 6D:
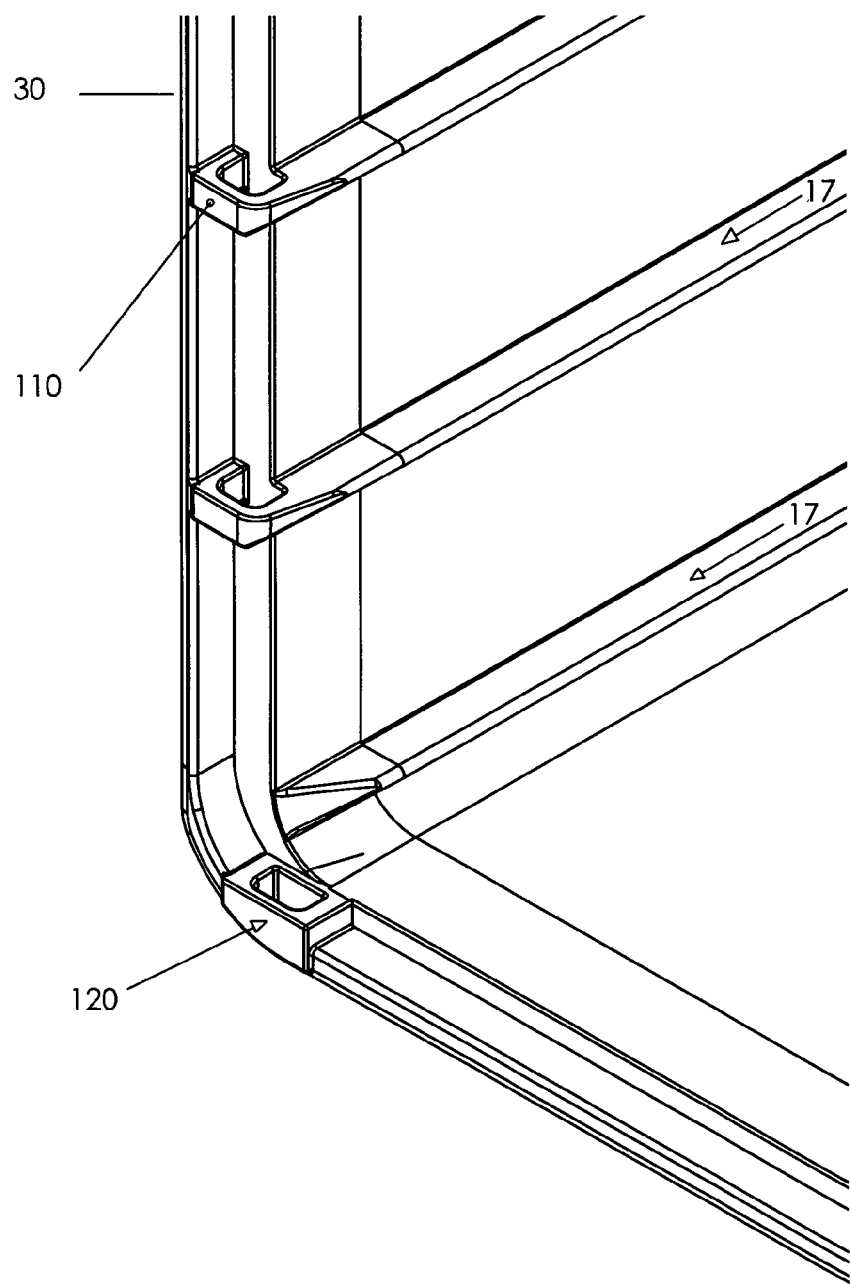

FIG. 6D is a view comparable to FIG. 6C of a lower part of the cart, showing the lower left corner of the frame 30. It can be seen in this figure that the cart has a lowermost guide rail 17 at a short distance above its bottom, but a lock eye aligned with this would be located in the bent corner part of the frame 30. Instead thereof, a recess 120 is formed in the lowermost part of the frame 30, in which a lock pin fits as will be discussed later. This recess is displaced in horizontal direction (in frontal view: to the right) with respect to the holes 112 aligned with each other. It is further noted that it is not essential that the holes 112 are mutually aligned.

Figure 7:
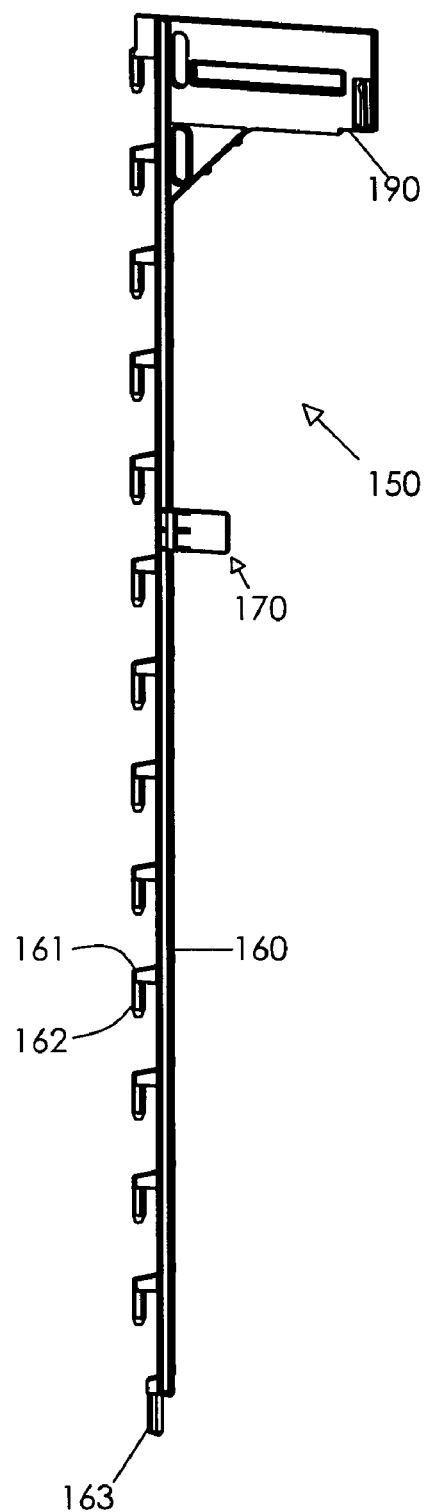
FIG. 7 shows a perspective view of a locking assembly according to the present invention.

For cooperation with the lock eyes 110 and the lock recess 120, the lock system 100 comprises a lock assembly 150 incorporated in the door body 21, of which FIG. 7 shows a perspective view. The lock assembly 150 comprises an elongate, vertically directed pin carrier 160. The pin carrier 160 carries a plurality of lock pins 162 directed vertically downwards, wherein each lock pin 162 is connected to the pin carrier 160 through a lock pin arm 161. The mutual distance between the lock pins corresponds to the mutual distance between the lock eyes 110. At its lower end, the pin carrier 160 carries another lock pin 163. Each pin 162, 163 may be formed separately and may be attached separately to the carrier 160, but it is preferred that the combination of carrier 160, arms 161, pins 162 and pin 163 is formed as an integral component.

The pin carrier 160 is vertically shiftable in the door body 121 between a lower extreme position and an upper extreme position. In the upper extreme position, the lock pins 162 are located between the lock eyes 110 in vertical direction: the door can now freely hinge in order to be opened and closed. If the door is closed, each lock pin 162, 163 is located precisely above a lock eye 110 or lock recess 120, respectively. If the pin carrier 160 is now shifted downwards to its lower extreme position, the lock pins 162 penetrate the corresponding lock eyes 110: the door is now bolted.

It is an important aspect of the present invention that the free side edge 23 of the door body 21 in the bolted condition is mechanically coupled to the door frame 30 at a relatively large number of places (in this example: 14).

It is important that the pin carrier 160 can be blocked in its lower extreme position, which will also be indicated as closed position. In order to offer this facility, the lock assembly 150 comprises a safety lip 170 attached to the pin carrier 160 at a central position. The safety lip 170 in top view has an L-shaped contour, and comprises a leg part 171 and a foot part 172 directed substantially perpendicular to the leg part. The safety lip 170 is implemented as a planar strip with a bent end defining the foot part, as can clearly be seen in FIG. 8A. The free end of the leg part 171 is connected to the pin carrier 160 (or forms a whole herewith). The planar leg part 171 is directed substantially parallel to the door body 21. The planar foot part 172 is directed substantially parallel to the side wall 13 (in the case of a closed door), wherein the foot part 172 is directed forward with respect to the leg part 171, it is to say it points away from the inner space 16.

Figure 8A:
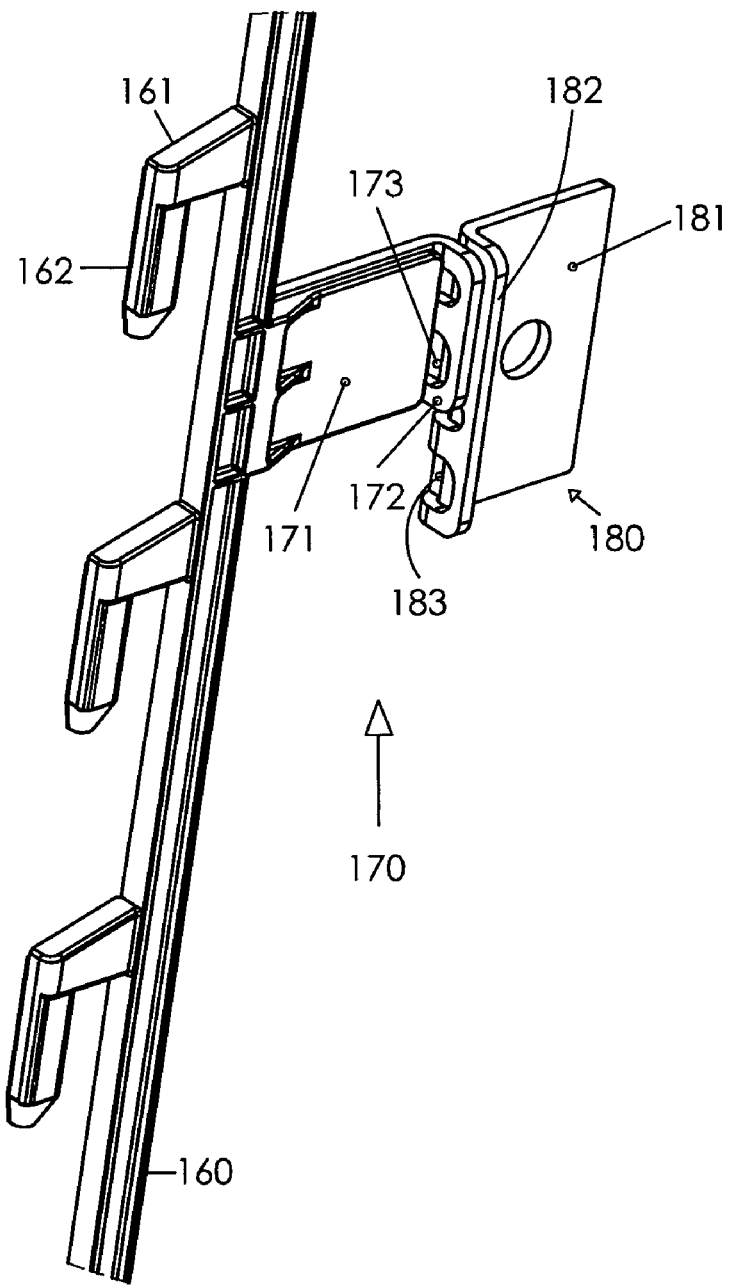
FIGS. 8A, 8B en 9 show details of the locking assembly of FIG. 7.

Further, an anchor plate 180 is mounted in the door body 21, also formed as an L-shaped bent plate with a leg part 181 and a foot part 182, wherein the foot part 182 is directed parallel to and is located at only a small distance from the foot part 172 of the safety lip 170, as is also clearly visible in FIG. 8A. The positions and dimensions of the foot parts 172 and 182 are such that these foot parts project outwards from the door body 21 at the visible side (outer side of the cart). At that location, the door body 21 has a recessed part 26 with a bottom 27 and side walls 28, as clearly visible in FIG. 8B, which shows a perspective view at a larger scale of the part VIII in FIG. 1A. The foot parts 172 and 182 project above the bottom 27 of this recessed part 26, but have a horizontal dimension smaller than the "height" of the side walls 28 of this recessed part 26 so that they do not project beyond the front face of the door body 21.

Both foot part 172 and 182 are provided with at least one hole 173, 183, respectively. When the pin carrier 160 is shifted vertically, the foot part 172 of the safety lip 170 shifts along the foot part 182 of the anchor plate 180. When the pin carrier 160 is in its lower extreme position, said holes 173 and 183 are aligned with each other, and for instance a padlock may be attached here: then, the pin carrier 160 cannot be shifted upwards, and the door cannot be opened.

Figure 8B:
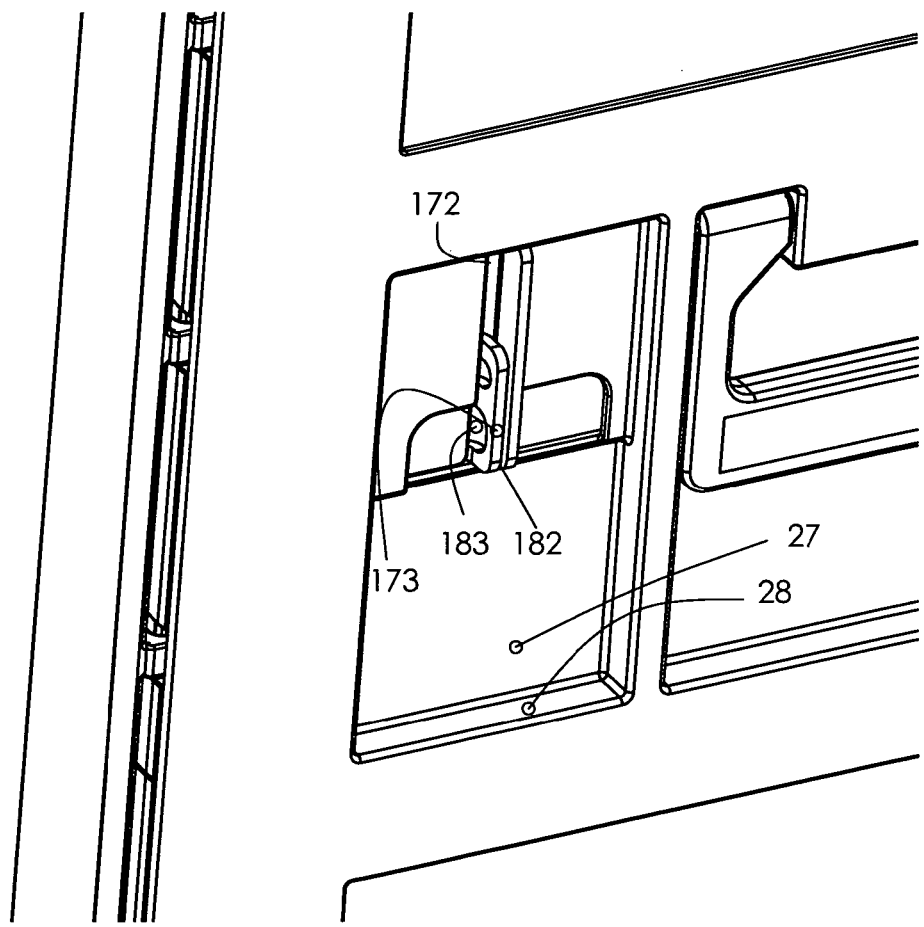

It is noted that FIGS. 8A and 8B show the pin carrier 160 in its upper extreme position.

Figure 9:
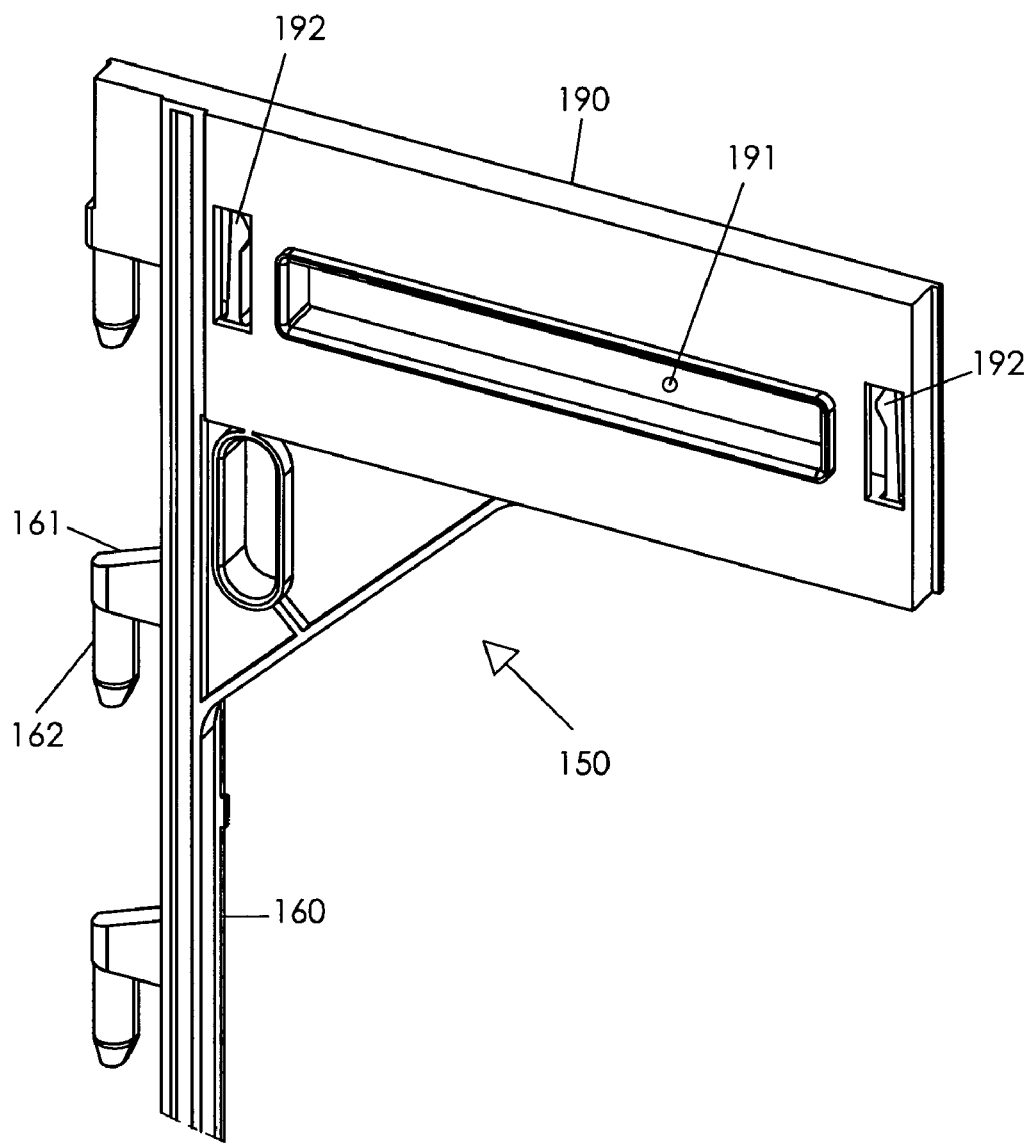

FIG. 9 is a perspective view of the upper end of the lock assembly 150 at a larger scale, illustrating that a handle 190 is attached to or integrally formed with the upper end of the pin carrier 160. The handle 190 is substantially plate-shaped, and extends in the interior of the door body 21, parallel to this door body. The handle 190 is provided with a horizontal recess or opening 191, in which the fingers of a user fit. FIG. 1B shows among other things that the door body 21 in its upper left corner has a window 29 through which the handle 190 is accessible.

In order to open the door, a user must lift the handle 190: the pins 162 leave the eyes 110 and the door is released. When the user lets go of the handle 190 this could shift downwards again under influence of gravity. When the door is then closed, it may visually appear that the door is closed and locked, while the lock pins 162 are not extending into the eyes 110 but are abutting the eyes 110 from the outside. This is a situation that may lead to potentially dangerous misunderstandings. In order to avoid this, the handle 190 is preferably, and as shown, provided with one or more holding members 192 holding the lock assembly 150 in its upper extreme position. Then, in order to close and lock the door, the user must actively displace the lock assembly 150 downwards. The non-locked condition of the door is visually perceivable by the handle 190 being in its upper position. This visual perception can be facilitated by for instance giving the part of the handle 190 below the recess 191 a red color and the part of the handle above the recess 191 a green color.

In the exemplary embodiment shown, the lock assembly 150 has two holding members 192. Each holding member 192 in this example is implemented as a resilient lip with a lateral projection, cooperating with a part, for instance a recess in a contra member, fixed with respect, to the door body 21 and not shown for sake of simplicity. In the lower extreme position, said lateral projection clicks into this recess. In order to displace the handle 190, said lateral projection must be moved out of this recess, against the resilient force of the lip, which requires a threshold force. It may be clear that the holding members may be implemented in several different ways. In a preferred embodiment, the holding member 192 is also capable, of holding the lock assembly 150 in its lower extreme position.

When the door panel 21 is loaded by a force acting perpendicularly on the surface, the door panel will have the tendency to bend in horizontal direction, because the door panel is well anchored to the door profile 30 along its vertical side edges. According to the invention, the door panel 21 can be given a good bending strength in horizontal direction by at least partly manufacturing the door panel 21 as an extrusion plate, wherein the extrusion direction is directed horizontally. FIG. 10A shows a perspective front view of this extrusion plate 200, with recesses 201 and 202 for the handle 190 and the blocking means 170, 180, respectively. At a larger scale, FIG. 10B shows a cross section view of a part of the extrusion plate 200 according to arrow B in FIG. 10A, in which a preferred configuration of the extrusion profile can be seen. The extrusion plate 200 comprises two mutually parallel plate parts 211, 212 that are connected to each other by means of oblique lamella 213, 214 in a triangular connection. The extrusion plate 200 is enclosed in two shell parts defining the outer wall and the inner wall of the door panel, respectively, but this is not shown in this figure for sake of simplicity.

The extrusion plate 200 is made from plastic by extrusion. The plastic used will typically be a thermoplast, selected to meet the demands of strength and fire safety, although it is at least in principle also possible that the plastic used has thermo hardening properties. A suitable use is polyetherimide (PEI) or polyphenylsulfon (PPSU), or a blend of at least one of these materials, but the present invention is not limited to applying these materials.

It will be clear for a person skilled in the art that the invention is not limited to the exemplary embodiments discussed in the above, but that several variations and modifications are possible within the protective scope of the invention as defined in the attached claims.

For instance, it should be clear that a catering cart that is not used in an airplane, for instance for use in a hospital, nursing home, elderly home, also falls under the protective scope.

Further, the favorable insights of the present invention can also be applied to stationary cabinets without wheels.

Features which have only been described for a certain embodiment can also be applied to other described embodiments.

The invention claimed is:

1. Trolley suitable for distributing food in aisles of airplanes, the trolley comprising:
a cabinet-shaped body comprising:
side walls each having an inner surface directed into the cabinet-shaped body and a front edge, the inner surface of the side walls provided with a plurality of horizontal guide rails projecting into the cabinet-shaped body; and
a door having side edges, one side edge of the door hingedly coupled to the front edge of one side wall, and the other side edge of the door lockable to the front edge of the other side wall; and
a multipoint locking system to lock the door of the cabinet-shaped body comprising;
a plurality of lock eyes, one each aligned with a respective guide rail of the side walls, each lock eye including a horizontal strip with a vertical hole, wherein the outer contour of the horizontal strip generally corresponds to the outer contour of the respective guide rail; and
a lock assembly accommodated in the door including an elongate pin carrier that is directed vertically, can shift vertically, and carries a plurality of lock pins directed vertically downwards;
wherein a guide rail is hollow, and wherein the horizontal strip of the hollow guide rail's lock eye, at its rear side, is provided with an extension piece fitting in the hollow guide rail.

2. Trolley according to claim 1 further comprising a door frame, wherein the lock eyes are an integral part of the door frame.

3. Trolley according to claim 1 further comprising a lock recess arranged in a bottom part of one of the cabinet-shaped body or a door frame of the cabinet-shaped body.

4. Trolley according to claim 1, wherein the pin carrier is provided with safety means accessible from the outside of the door.

5. Trolley according to claim 1, wherein the lock assembly is provided with one or more holding members to hold the lock assembly in its upper extreme position.

6. Trolley according to claim 1, wherein the door comprises an extrusion plate with a horizontal extrusion direction.

7. Trolley according to claim 6, wherein the extrusion plate is implemented with double walls, with a system of plate-shaped, longitudinal ribs in a triangular configuration in between.

8. Trolley according to claim 6, wherein the extrusion plate is made from the group consisting of polyetherimide (PEI), a blend comprising polyetherimide, polyphenylsulfon (PPSU), and a blend comprising polyphenylsulfon.

9. Trolley according to claim 1, wherein the door comprises a door body of which one side edge is attached to the cabinet-shaped body or to a door frame attached to the cabinet-shaped body by means of a multipoint piano hinge.

10. Trolley according to claim 9, wherein the multipoint piano hinge is a double action hinge.

11. Trolley according to claim 1, wherein at least one guide rail is an extrusion profile co-extruded with the corresponding side wall.

12. Trolley suitable for distributing food in aisles of airplanes, the trolley comprising:
- a cabinet-shaped body comprising:
  - side walls each having a front edge; and
  - a door having side edges, one side edge of the door hingedly coupled to the front edge of one side wall, and the other side edge of the door lockable to the front edge of the other side wall; and
- a multipoint locking system to lock the door of the cabinet-shaped body comprising;
  - a plurality of lock eyes; and
  - a lock assembly accommodated in the door including an elongate pin carrier that is directed vertically, can shift vertically, and carries a plurality of lock pins directed vertically downwards, the pin carrier provided with safety means accessible from the outside of the door;
- wherein the safety means comprise a safety lip attached to the pin carrier, the safety lip including cooperative foot parts, a foot part projecting forwards out of the door and a foot part of an anchor plate, the anchor plate attached in the door with the foot part projecting forwards out of the door and extending adjacent the cooperative foot part of the safety lip; and
- wherein the cooperative foot parts are provided with respective holes that in a lower extreme position of the pin carrier are aligned with each other.

13. Trolley according to claim 12, wherein the lock assembly is provided with one or more holding members to hold the lock assembly in its upper extreme position.

14. Trolley according to claim 12, wherein the door comprises an extrusion plate with horizontal extrusion direction.

15. Trolley according to claim 14, wherein the extrusion plate is implemented with double walls, with a system of plate-shaped, longitudinal ribs in a triangular configuration in between.

16. Trolley according to claim 14, wherein the extrusion plate is made from the group consisting of polyetherimide (PEI), a blend comprising polyetherimide, polyphenylsulfon (PPSU), and a blend comprising polyphenylsulfon.

17. Trolley according to claim 12, wherein the door comprises a door body of which one side edge is attached to the cabinet-shaped body or to a door frame attached to the cabinet-shaped body by means of a multipoint piano hinge.

18. Trolley according to claim 17, wherein the multipoint piano hinge is a double action hinge.

19. Trolley suitable for distributing food in aisles of airplanes, the trolley comprising:
- a cabinet-shaped body comprising:
  - side walls each having a front edge; and
  - a door having a window and side edges, one side edge of the door hingedly coupled to the front edge of one side wall, and the other side edge of the door lockable to the front edge of the other side wall; and
- a multipoint locking system to lock the door of the cabinet-shaped body comprising;
  - a plurality of lock eyes; and
  - a lock assembly accommodated in the door including an elongate pin carrier that is directed vertically, can shift vertically, and carries a plurality of lock pins directed vertically downwards;
- wherein a substantially plate-shaped handle is attached to or integrally formed with the upper end of the pin carrier, extending in the interior of the door and accessible through the window formed in the door.

20. Trolley according to claim 19, wherein the lock assembly is provided with one or more holding members to hold the lock assembly in its upper extreme position.

21. Trolley according to claim 19, wherein the door comprises an extrusion plate with horizontal extrusion direction.

22. Trolley according to claim 21, wherein the extrusion plate is implemented with double walls, with a system of plate-shaped, longitudinal ribs in a triangular configuration in between.

23. Trolley according to claim 21, wherein the extrusion plate is made from the group consisting of polyetherimide (PEI), a blend comprising polyetherimide, polyphenylsulfon (PPSU), and a blend comprising polyphenylsulfon.

24. Trolley according to claim 19, wherein the door comprises a door body of which one side edge is attached to the cabinet-shaped body or to a door frame attached to the cabinet-shaped body by means of a multipoint piano hinge.

25. Trolley according to claim 24, wherein the multipoint piano hinge is a double action hinge.

\* \* \* \* \*